United States Patent [19]

Kricheldorf et al.

[11] Patent Number: 5,004,836

[45] Date of Patent: Apr. 2, 1991

[54] AROMATIC POLYETHERS CONTAINING KETO GROUPS IN SIDE CHAINS

[75] Inventors: Hans-Rytger Kricheldorf, Hamburg; Ulrich Delius, Ahrensburg; Rolf Wehrmann, Krefeld, all of Fed. Rep. of Germany

[73] Assignee: Bayer Aktiengesellschaft, Leverkusen, Fed. Rep. of Germany

[21] Appl. No.: 435,045

[22] Filed: Nov. 13, 1989

[30] Foreign Application Priority Data

Nov. 15, 1988 [DE] Fed. Rep. of Germany ....... 3838644

[51] Int. Cl.$^5$ ............................................. C07C 49/213
[52] U.S. Cl. ..................................... 568/333; 528/125
[58] Field of Search ......................... 568/333; 528/125

[56] References Cited

U.S. PATENT DOCUMENTS

| 3,878,169 | 4/1975 | Guillet et al. | 528/125 |
| 3,929,901 | 12/1975 | Darsow et al. | 568/333 |
| 4,051,109 | 9/1977 | Barr et al. | 568/333 |

FOREIGN PATENT DOCUMENTS 0264499  4/1988  European Pat. Off. ............ 568/333

*Primary Examiner*—James H. Reamer
*Attorney, Agent, or Firm*—Connolly and Hutz

[57] ABSTRACT

This invention relates to new aromatic polyethers, preferably polyphenylene ethers, containing keto groups in side chains and their use.

3 Claims, No Drawings

AROMATIC POLYETHERS CONTAINING KETO GROUPS IN SIDE CHAINS

This invention relates to new aromatic polyethers, preferably polyphenylene ethers containing keto groups in side chains and to their use.

Aromatic polyethers such as polyphenylene oxide (PPO), polyether sulphones, polyether ketones or polyether amides are polymers with high dimensional stability in the heat. They are relatively resistant to oxidation and difficulty inflammable, and partially crystalline polyarylene ethers such as polyether etherketones (PEEK) have a high resistance to chemicals and solvents.

It is well known that these polymers may be prepared by nucleophilic substitution reactions in dipolar aprotic solvents. The preparation of PPO by such reactions has not hitherto been known.

The polymers prepared by nucleophilic substitution reactions contain no functional (reactive) groups. They are hardly suitable for certain technical applications, e.g. as membrane materials for the separation of gases.

New aromatic polyethers have now been found, particularly aromatic polyethers containing keto groups in side chains, which are obtainable by nucleophilic substitution reactions.

The present invention relates to aromatic polyethers, preferably containing keto groups in side chains and corresponding to formula (I)

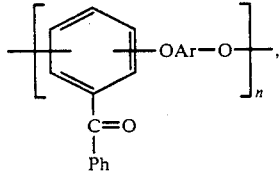

(I)

wherein
Ar stands for a $C_6$–$C_{30}$-aryl group optionally substituted with $C_1$–$C_4$-alkyl, $C_6$–$C_{14}$-aryl or $C_7$–$C_{24}$-aralkyl or alkaryl,
Ph stands for phenyl optionally substituted by —X—$C_4$–$C_4$-alkyl or X—$C_6$–$C_{14}$-aryl, wherein X stands for oxygen (O) or sulphur (S) and
n stands for an integer from 3 to 250.
Ar preferably stands for a group of formula (Ia)

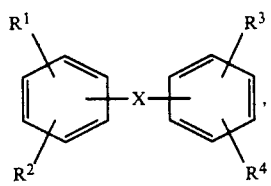

(Ia)

wherein
X denotes a chemical bond, an oxygen atom, a sulphur atom, a sulphone group, carbonyl group or a $C_3$–$C_{20}$-alkylene group, preferably isopropylidene, and
$R^1$ to $R^4$ denote, independently of one another, hydrogen or $C_1$–$C_{20}$-alkyl, preferably hydrogen or methyl, $C_6$–$C_{14}$-aryl or halogen such as Cl or Br.

The aryl group Ar and phenyl group Ph may be substituted with functional groups, e.g. with —$NR_2$ (R=H, $C_1$–$C_4$-alkyl), These groups are preferably electron shifting groups.

The index n in formula (I) stands for an integer of from 3 to 250, preferably from 5 to 200, most preferably from 5 to 150.

The present invention relates to a process (A) for the preparation of the aromatic polyethers, preferably polyphenylene oxides of formula (I)

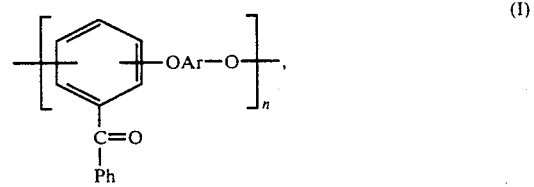

(I)

wherein
Ar stands for a $C_6$–$C_{30}$-aryl group optionally substituted with $C_1$–$C_4$-alkyl, $C_6$–$C_{14}$-aryl, $C_7$–$C_{24}$-aralkyl or $C_7$–$C_{24}$-alkaryl,
Ph stands for phenyl optionally substituted by X—$C_1$–$C_4$-alkyl or —X—$C_6$–$C_{14}$-aryl, wherein X stands for oxygen (O) or sulphur (S) and
n stands for an integer of from 3 to 250, characterised in that dihalogenobenzophenones corresponding to formula (II)

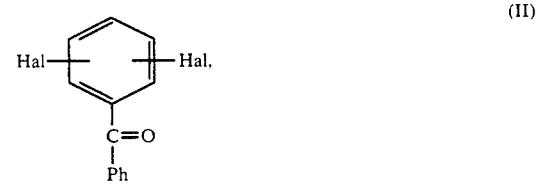

(II)

wherein
Hal stands for a halogen such as fluorine (F) or chlorine (Cl), preferably fluorine, and
Ph has the meaning given for formula (I) are reacted in known manner with bis-trialkyl-silylethers corresponding to formula (III)

$R^5{}_3Si$—O—Ar—O—$SiR^5{}_3$  (III)

wherein
$R^5$ stands for an optionally branched $C_1$–$C_6$-alkyl group, preferably a methyl, ethyl or propyl group, and
Ar has the meaning indicated for formula (I).

The trimethylsilyl ethers of formula (III) are known and may be prepared, e.g. by the known method of reacting bisphenols with hexamethyldisilazane and isolated e.g. by fractional distillation under vacuum or by crystallisation.

The following are examples of suitable diols for the preparation of the silyl ethers: Hydroquinone, methylhydroquinone, 4,4'-dihydroxybiphenyl, bis-(4-hydroxyphenyl)sulphone, 4,4'-dihydroxy-diphenylether, bis-(4-hydroxyphenyl)-methane, 2,2-bis-(4-hydroxyphenyl)-propane (bisphenol A), 1,6-, 1,7-, 2,6- and 2,7-naphthalenediol, phenolphthalein, etc..

The following are examples of dihalogeno compounds corresponding to formula (II): 2,6-Difluorobenzophenone, 2,6-difluoro-4'-methoxybenzophenone, 2,6- difluoro-4'-methyl-benzophenone, 2,6-difluoro-4'-(4-acetylyl-phenoxy)benzophenone, 2,6-difluoro-4'-methylmercapto-benzophenone, etc. These compounds are known and may be prepared e.g. by known methods.

The condensation reactions for the preparation of the new polyarylethers may be catalysed by salts, e.g. alkali metal salts such as alkali metal halides, e.g. CsF.

The salts used as catalysts are preferably of the type which dissociate into a soft cation and a hard anion in the solvent used.

The quantity of catalyst used is about 0.01 to 0.1 mol per mol of dihalogen compound of formula (II).

The process according to the invention may be carried out with or without diluent, but preferably without diluent.

The reaction temperature employed is in the range of from 180° to 220° C. and is successively increased as condensation progresses. The final temperatures are in the region of 280° to 320° C. A vacuum (up to about $10^{-3}$ bar) is applied towards the end of the reaction. Readily volatile trialkylsilyl halide is obtained as by-product.

In one particular embodiment, the process may be carried out by condensing e.g. a 2,4- or 2,6-dihalobenzophenone with another activated aromatic dihalo compound. Dihalobenzophenones may also, for example, be polycondensed with mixtures of several silylated bisphenols.

The invention also relates to a process (B) for the preparation of aromatic polyethers corresponding to formula (I)

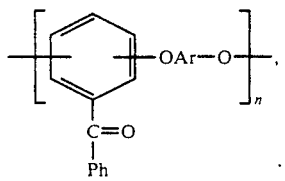

(I)

wherein
Ar stands for a $C_6$-$C_{30}$-aryl group optionally substituted with $C_1$-$C_4$-alkyl, $C_6$-$C_{14}$-aryl, $C_7$-$C_{24}$-aryl alkyl or $C_7$-$C_{24}$-alkaryl, Ph stands for phenyl optionally substituted with X—$C_6$-$C_4$-alkyl or X—$C_1$-$C_{14}$-aryl, wherein X stands for oxygen (O) or sulphur (S) and n stands for an integer of from 3 to 250, characterised in that dihalogenobenzophenones corresponding to formula (II)

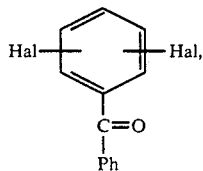

(II)

wherein
Hal stands for a halogen such as fluorine (F) or chlorine (Cl), preferably fluorine, and Ph has the meaning given for formula (I) are reacted in known manner with aromatic dihydroxy compounds corresponding to formula (IV)

HO—Ar—OH (IV)

wherein
Ar has the meaning given for formula (I) in the presence of from 1 to 1.3 equivalents of basic catalysts, based on the quantity of dihydroxy compounds of formula (IV), and the molar ratio of dihalogenobenzophenones of formula (II) put into the process to dihydroxy compounds of formula (IV) is from 0.98:1 to 1.02:1, based on the quantity of dihydroxy compounds put into the process, and in that the reaction is carried out in a dipolar aprotic solvent corresponding to formula (V) and/or (VI)

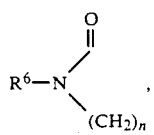

(V)

$$R^7-Y-R^8,$$ (VI)

wherein
$R^6$-$R^8$ denote, independently of one another, $C_1$-$C_{20}$-alkyl or cycloalkyl, preferably methyl or $C_6$-$C_{20}$-aryl, preferably phenyl, Y denotes a sulphoxide or sulphone group and
n stands for the number 3, 4 or 5,
the ratio of solvent to solids content amounting to 10:1 to 1:1 and the reaction temperature being in the region of 100° to 350° C., preferably from 150° to 250° C.

The reaction time is generally from 1 to 50 hours, preferably from 2 to 20 hours.

Examples of dihalobenzophenones of formula (II) include 2,6-difluorobenzophenone, 2,6-dichlorobenzophenone, 2,4-difluorobenzophenone, 2,4-dichlorobenzophenone etc.

The following are examples of dihydroxy compounds corresponding to formula (IV): Hydroquinone, methylhydroquinone, 4,4'-dihydroxydiphenyl, 4,4'-dihydroxydiphenylether, bis-(4-hydroxyphenyl)-methane, 2,2-bis(4-hydroxyphenyl)-propane (bisphenol A), 1,6-, 1,7-, 2,6- and 2,7-naphthalenediol, etc.

N-methylpyrrolidone, N-methylcaprolactam, etc. are examples of solvents corresponding to formula (V).

Dimethylsulphoxide, diphenylsulphone, sulpholan, etc. are examples of solvents corresponding to formula (VI).

Examples of basic catalysts include basic alkali metal and alkaline earth metal salts such as sodium hydroxide, potassium hydroxide, sodium methanolate, potassium carbonate, potassium bicarbonate, etc.

The reaction mixture is preferably dehydrated azeotropically before the reaction (condensation), for example by adding a conventional entrainer such as toluene, mesitylene, chlorobenzene, dichlorobenzene, etc. The reaction is preferably carried out under inert gas (e.g. nitrogen, argon). The reaction temperature is successively raised as condensation progresses, preferably to 150°-250° C., water and entrainer being removed from the reaction mixture at the same time. A gradual rise in viscosity can be observed.

The polymer is subsequently isolated by precipitation, e.g. from alcohols or alcohol/water mixtures such as methanol, ethanol or isopropanol.

The aromatic polyethers according to the invention are distinguished inter alia in that their physical-chemical properties can be chemically varied by reactions on the phenyl groups Ph which are substituted in side chains. As an example, a mercapto group may easily be oxidized to the sulphone.

The new aromatic polyethers are more hydrophilic than PPO. They are very suitable e.g. for the preparation of membranes which may be used inter alia for the separation of gases, etc.

EXAMPLE 1

(Process A)

10.91 g (50 mmol) of 2,6-difluorobenzophenone, 12.72 g (50 mmol) of hydroquinone bis-trimethyl-silyl ether and 100 mg of caesium fluoride are introduced into a 100 ml two-necked flask equipped with reflux condenser and stirrer in an atmosphere of nitrogen. The reaction mixture is then heated to 200° C. for 2 hours and 250° C. for a further 2 hours and then to 280° C. for ½ hour. A vacuum is applied during the last ½ hours. When the reaction product has cooled, it is dissolved in a mixture of trifluoracetic acid and four times is quantity (by volume) of dichloromethane, precipitated in methanol, isolated by filtration and dried in a water-jet vacuum at 120° C.

Yield: 74%

CHN analysis: C, 78.50% (calculated 79.1), H, 4.31% (calculated 4.19).

Tg.: 132° C.

EXAMPLE 2

(Process B)

9.31 g (50 mmol) of 4,4'-dihydroxydiphenyl, 10.91 g (50 mmol) of 2,6-difluorobenzophenone and 9 g of potassium carbonate in 100 ml of anhydrous N-methylcaprolactam and 50 ml of anhydrous toluene are introduced into a 500 ml three-necked flask which is equipped with motorized stirrer, internal thermometer and water separator and has been heated under vacuum and ventilated with nitrogen. The solution is dehydrated for about 3 hours. Toluene is then removed stepwise at such a rate that the reaction temperature rises to 180° C. The reaction mixture is stirred at this temperature for 8 hours, during which a gradual rise in viscosity is observed. After further removal of toluene, the temperature is raised to 190°-195° C. and stirring is continued for one hour. The solution is diluted with about 200 ml of NMC and filtered hot, neutralised with dilute acetic acid and precipitated in 10 times its quantity of a mixture of methanol/water (1:1). The polymer is boiled with water for one hour, suction filtered, dissolved in methylene chloride, precipitated from methanol and dried in a water jet vacuum at 80° C.

Yield: 56%

Tg: 163° C.

EXAMPLE 3

Modification of an aromatic polyether according to the invention by a chemical reaction on substitutents of the phenyl group Ph.

3.62 g (8 mmol) of the polyarylene ether of BPA-bis-trimethylsilylether and 2,6-difluoro-4'-methyl-mercaptobenzophenone are dissolved in a mixture of 200 ml of dioxane, 25 ml of glacial acetic acid and 25 ml of acetic anhydride. 2.5 ml of 30% hydrogen peroxide (about 25 mmol) are carefully added at 0° C. with stirring. The reaction solution is left to stand at room temperature for 24 hours and then heated under reflux for one hour. When the solution is cold, it is poured out on 1.2 times its quantity of a methanol/water mixture (3:1). The precipitated product is suction filtered and dried in a water jet vacuum at 70° C.

Yield: 3.6 g = 93%.

The completeness of the reaction can be confirmed $^1$H—NMR spectroscopically by the shift in the resonance signal of the methyl group attached to the sulphur atom. The original signal at 2.47 PPM disappears completely after oxidation and a new peak is seen at 3.05 ppm.

TABLE 1

Reaction conditions and yields of polyethers prepared from 2,6-difluoro-benzophenone and various silylated bisphenols

| Formula | Silyl bisphenol | Temp. (°C.) | Time (min.) | Yield (%) | $\eta_{inh}^a$ (dl/g) | Empirical formula (mol. wt.) | Elementary analysis | |
|---|---|---|---|---|---|---|---|---|
| | | | | | | | C | H |
| 1a | Hydroquinone | 200, 250, 280, 280 | 120, 120, 30, 30 i. vac. | 74 | 0.27 | $C_{19}H_{12}O_3$ (288.31) | Calcd. 79.15 Found 78.56 | 4.20 4.18 |
| 1b | Methylhydroquinone | 180, 200, 250, 280, 280 | 90, 60, 30, 30, 30 i.vac. | 79 | 0.79 | $C_{20}H_{14}O_{13}$ (302.34) | Calcd. 79.45 Found 79.01 | 4.68 4.66 |
| 1c | Phenylhydroquinone | 180, 200, 250, 300, 300 | 60, 100, 75, 30, 30 i. vac. | 89 | 0.51 | $C_{25}H_{16}O_3$ (364.41) | Calcd. 82.39 Found 82.16 | 4.43 4.45 |
| 1d | 4,4'-Dihydroxybiphenyl | 220, 250, 280, 280 | 60, 90, 45, 30 i. vac. | 90 | 0.16 | $C_{25}H_{16}O_3$ (364.41) | Calcd. 82.39 Found 81.92 | 4.43 4.55 |
| 1e | Bisphenol-A | 180, 200, 280, 280 | 60, 60, 30, 30 i. vac. | 97 | 0.27 | $C_{28}H_{22}O_3$ (436.48) | Calcd. 82.73 Found 82.05 | 5.46 5.54 |
| 1f | Phenolphthalein | 200, 250, 280, 280 | 90, 90, 30, 30 i. vac. | 93 | 0.32 | $C_{33}H_{20}O_5$ (496.53) | Calcd. 79.82 Found 79.41 | 4.07 4.19 |

$^a$determined with c = 2 g/l at 20° C. in dichloromethane/trifluoroacetic acid (4:1 volume)

TABLE 2

Reaction conditions and yields of poly(ethers) prepared with substituted 2,6-difluorobenzophenones and silylated bisphenols

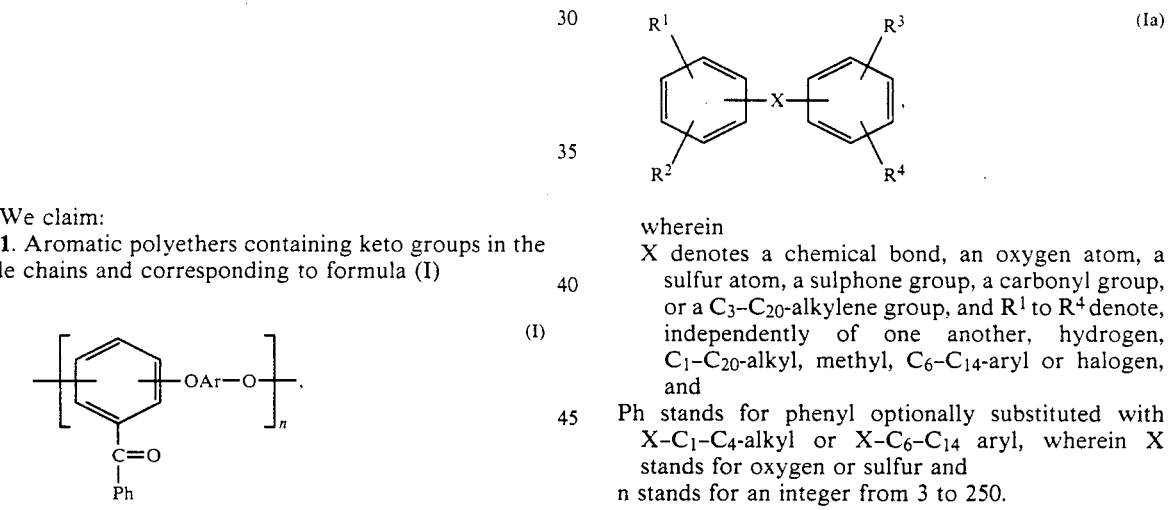

| Silyl. bisphenol | Difluoroaromatic(s) No. | Temp. (°C.) | Time (min) | Yield (%) | $\eta_{inh}^a$ (dl/g) | Empirical formula (mol. wt.) | Elementary analysis | | | |
|---|---|---|---|---|---|---|---|---|---|---|
| | | | | | | | | C | H | S |
| Bisphenol-A | Ia | 200, 220, 280, 280, 280 | 15, 30, 60, 60, 30 i. vac. | 82 | 0.28 | $C_{29}H_{24}O_3S$ (452.59) | Calcd. Found: | 76.95 76.89 | 5.36 5.48 | 17.08 6.92 |
| Bisphenol-A | Ib | 180, 200, 240, 300, 300 | 60, 20, 20, 10, 10, 30 i. vac. | 98 | 0.21 | $C_{29}H_{24}O_4$ (436.53) | Calcd. Found: | 79.79 77.25 | 5.55 5.52 | — — |
| Hydroquinone | Ib + IIa[b] | 200, 220, 280, 300, 320, 320 | 15, 90, 30, 30, 30, 30 i. vac. | 78 | 0.34 | $C_{19.5}H_{13}O_{3.5}$ (303.33) | Calcd. Found: | 77.21 75.87 | 4.43 4.31 | — — |
| Hydroquinone | Ia + IIb[b] | 200, 220, 250, 250, 280, 280 | 30, 120, 30, 30, 30, 30 i. vac. | 88 | 0.36 | $C_{19}H_{13}O_{3.5}S$ (329.38) | Calcd. Found: | 69.28 67.62 | 3.99 3.97 | 9.73 — |
| Bisphenol-A | Ib + IIa[b] | 220, 250, 280, 320, 320 | 90, 30, 30, 30, 30 i. vac. | 87 | 0.84 | $C_{28}H_{22}O_{3.5}$ (421.52) | Calcd. Found: | 81.20 80.76 | 5.51 5.53 | — — |

[a] determined with c = 2 g/l at 20° C. in dichloromethane/trifluoroacetic acid (4:1 volume)
[b] molar ratio 1:1

We claim:

1. Aromatic polyethers containing keto groups in the side chains and corresponding to formula (I)

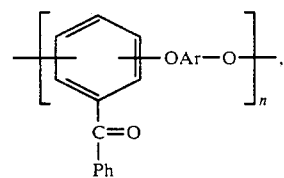

wherein
Ar stands for $C_6-C_{30}$-aryl group optionally substituted with $C_1-C_4$ alkyl, $C_6-C_{14}$-aryl, $C_7-C_{24}$-aryl, $C_7-C_{24}$-alkaryl, or a group of the formula (Ia)

$$\text{(Ia)}$$

wherein
X denotes a chemical bond, an oxygen atom, a sulfur atom, a sulphone group, a carbonyl group, or a $C_3-C_{20}$-alkylene group, and $R^1$ to $R^4$ denote, independently of one another, hydrogen, $C_1-C_{20}$-alkyl, methyl, $C_6-C_{14}$-aryl or halogen, and Ph stands for phenyl optionally substituted with $X-C_1-C_4$-alkyl or $X-C_6-C_{14}$ aryl, wherein X stands for oxygen or sulfur and
n stands for an integer from 3 to 250.

2. The polyether ketone of claim 1 wherein X denotes isopropylidene.

3. The polyether ketone of claim 1 wherein the halogen denoted by $R^1$ to $R^4$ is selected from Cl or Br.

* * * * *